US012774194B2

(12) United States Patent
Blondel et al.

(10) Patent No.: US 12,774,194 B2
(45) Date of Patent: Oct. 27, 2026

(54) METHOD TO OPTIMIZE AN ANTI-SWAY FUNCTION

(71) Applicant: Schneider Electric Industries SAS, Rueil-Malmaison (FR)

(72) Inventors: Charles Blondel, Cras (FR); Jean-François Carvalho, Miserey (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 239 days.

(21) Appl. No.: 18/708,235

(22) PCT Filed: Oct. 26, 2022

(86) PCT No.: PCT/EP2022/079896

§ 371 (c)(1),
(2) Date: May 8, 2024

(87) PCT Pub. No.: WO2023/099086

PCT Pub. Date: Jun. 8, 2023

(65) Prior Publication Data

US 2024/0425328 A1 Dec. 26, 2024

(30) Foreign Application Priority Data

Dec. 1, 2021 (EP) .................................... 21306674

(51) Int. Cl.
*B66C 13/06* (2006.01)
*B66C 13/46* (2006.01)
(Continued)

(52) U.S. Cl.
CPC ............ *B66C 13/063* (2013.01); *B66C 13/06* (2013.01); *B66C 13/46* (2013.01); *B66C 13/48* (2013.01); *B66C 17/00* (2013.01); *B66C 2700/08* (2013.01)

(58) Field of Classification Search
CPC ....... B66C 13/063; B66C 13/06; B66C 13/46; B66C 13/48; B66C 17/00; B66C 2700/08; B66C 23/54
See application file for complete search history.

(56) References Cited

U.S. PATENT DOCUMENTS 5,495,955 A 3/1996 Shibata
5,961,563 A * 10/1999 Overton ................ B66C 13/063 701/50
(Continued)

FOREIGN PATENT DOCUMENTS

CN 1697776 A 11/2005
CN 108349711 A 7/2018
(Continued)

OTHER PUBLICATIONS

International Search Report and Written Opinion dated Jan. 30, 2023 for corresponding International Application No. PCT/EP2022/079896, 11 pages.

*Primary Examiner* — Thomas Randazzo
(74) *Attorney, Agent, or Firm* — Kinney & Lange, P.A.

(57) ABSTRACT

A method for optimizing a model used in real time by an antisway function for the transport of a load by a hoisting appliance, including a gantry able to move along a first axis and a trolley able to move along a second axis, wherein, when transported, the load presents a first sway along the first axis and a second sway along the second axis. The model represents the theorical sway of the load over time, including a first curve representing a first sway, a second curve representing a second sway, and a third curve representing a third sway being a vector of the first sway and the second sway. A control device determines a first remarkable point for the first curve or the second curve depending on the torque of the gantry or the trolley when one of the gantry and the trolley is accelerating, determines a second remarkable point for the first curve or the second curve depending on the torque of the gantry or the trolley when one of the gantry and the trolley is stopped, determines a first remarkable point or the second remarkable point for the third curve depending on a load measurement or the torque of the hoist mechanism when the gantry and the trolley are moving at a steady speed, and synchronizes the model with at least one of the remarkable points.

8 Claims, 9 Drawing Sheets

(51) Int. Cl.
*B66C 13/48* (2006.01)
*B66C 17/00* (2006.01)

(56) References Cited

U.S. PATENT DOCUMENTS

| | | | | |
|---|---|---|---|---|
| 6,460,711 | B1 * | 10/2002 | Kato | B66C 13/063 212/275 |
| 2002/0158036 | A1 * | 10/2002 | Ong | B66C 13/063 212/275 |
| 2004/0155004 | A1 | 8/2004 | Laundry et al. | |
| 2007/0050115 | A1 * | 3/2007 | Discenzo | B66C 13/22 701/50 |
| 2008/0156761 | A1 * | 7/2008 | Schneider | B66C 13/063 212/273 |
| 2009/0218305 | A1 * | 9/2009 | Ikeguchi | B66C 13/063 212/275 |
| 2023/0107388 | A1 * | 4/2023 | Feng | B66C 13/48 700/28 |

FOREIGN PATENT DOCUMENTS

| | | | | |
|---|---|---|---|---|
| CN | 109153548 | A | 1/2019 | |
| CN | 109689559 | A | 4/2019 | |
| CN | 112173950 | A | 1/2021 | |
| CN | 112512951 | A | 3/2021 | |
| DE | 4223561 | A1 | 1/1994 | |
| EP | 3816090 | A1 | 5/2021 | |
| FI | 920751 | A0 | 2/1992 | |
| FR | 3816090 | B1 * | 3/2023 | B66C 13/08 |
| JP | WO-9308115 | A1 * | 4/1993 | B66C 13/063 |

* cited by examiner

METHOD TO OPTIMIZE AN ANTI-SWAY FUNCTION

FIELD OF INVENTION

The present invention generally relates to a method for an anti-sway function applied to a hoisting appliance that is spanning a warehouse, the hoisting appliance being arranged for carrying a load suspended by cables from a trolley that can move with the hoisting appliance.

BACKGROUND

Hoisting appliances 1 such as bridge cranes, gantry cranes or overhead travelling cranes usually comprise a trolley 2 which can move over a single girder or a set of rails 3 along a horizontal axis Y, as shown in FIG. 1. This first movement along the Y-axis is generally referred to as short travel movement and/or trolley movement. Depending on the type of appliance, the girder or the set of rails 3, also referred to as bridge, may also be movable along a horizontal axis X perpendicular to the Y-axis, thus enabling the trolley to be moved along both the X- and Y-axes. This second movement along the X-axis is generally referred to as long travel movement and/or bridge, crane or gantry movement. The amount of available short travel along the Y-axis and long travel along the X-axis determines a hoisting area that is spanned by the hoist 1.

A tool 4, also called load suspension device, is associated with a reeving system having cables which pass through the trolley 2, the length of the cables 5 being controlled by the trolley 2 to vary, thereby enabling displacement of a load 6 along a vertical axis Z, referred to as hoisting movement.

Transferring a suspended load across a warehouse, a hall, shipyard, metallurgic or nuclear plant, requires an operator to be very careful to prevent people, obstacles or objects that are present within the hoisting area from being hit or damaged in any way. Hence, in addition to size, swinging of the suspended load, commonly referred to as sway, is something that the operator needs to take in account when manoeuvring the load across the working place along a trajectory within the boundaries of the hoisting area.

This complexity is what has hampered development of fully automated hoisting systems being capable of transferring suspended loads independently along a trajectory. Some advanced antisway functions are difficult and time consuming to put in place, which is mainly due to the large number of parameters that are variable and specific for each crane.

Several solutions already exist to resolve sway issues and can be chosen depending on expected accuracy, environment conditions (rain, snow, dust, etc. . . . ), or targeted performance.

On heavy industry factories, overhead cranes are necessary to handle heavy loads. For economical and efficiencies reasons such companies implement antisway system on their overhead crane to facilitate handling operation, to increase the quality of their finish products and to reduce mechanical constraint on crane avoiding premature wear of mechanical parts.

In order to implement an antisway system providing high accuracy, high performance and able to work in a severe environment, a first solution is to use a close loop antisway offering better accuracy and performance, and a second solution is to use an open loop allowing harsh environment.

However for the first solution, there is no sensor able to operate under high temperature (over 100° C. ambient temperatures) in steel making plants for example. Also most of the sensors are based on optical technologies (laser/infra red) and they are therefore sensitive to dust, snow, heavy rain, flying object such as plastic bags in waste industries. Besides, installation of sensor is sometime not possible because there is no energy available on the location or no available location to allow operation without any damage of the sensor.

For the second solution, accuracy and performance issues of an open loop system are mainly resulting from the impossibility to model external behaviors, such as:

- Sway at the ignition of the movement
- Sway generated by the Wind on outdoor crane
- Sway resulting of mechanical behavior (rolling)
- Sway generating by the load geometry during the movement (mass distribution)
- Sway generated during taking off the load
- Sway generated by the handling tool All these behaviors generates a desynchronization of the model compared to the reality: it could be a periodical de-synchronism or it can be due to over or under estimation of the angle amplitude.

Accordingly, there is a need for implementing an antisway system providing high accuracy, high performance and able to work in a severe environment.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method for optimizing a model used in real time by an antisway function for the transport of a load by a hoisting appliance spanning a hoisting area and comprising a gantry and a trolley able to transport the load suspended to a hoist mechanism hosted in the trolley, the gantry being able to move along a first axis and the trolley being able to move along a second axis, wherein, when transported, the load presents a first sway along the first axis and presents a second sway along the second axis, the model representing the theorical sway of the load over time, comprising a first curve representing a first sway along the first axis, a second curve representing a second sway along the second axis, and a third curve representing a third sway being a vector of the first sway and the second sway, the method comprising in a control device:

- when only the gantry is moving and accelerating along the first axis, determining a first remarkable point for the first curve of the model as a maximum first sway when the torque of the gantry reaches a maximum value,
- when only the trolley is moving and accelerating along the second axis, determining a first remarkable point for the second curve of the model as a maximum second sway when the torque of the trolley reaches a maximum value,
- when the gantry is stopped along the first axis, determining a second remarkable point for the first curve of the model as a maximum negative value of the angle of the first sway when the torque of the gantry reaches a maximum value or as a maximum positive value of the angle of the first sway when the torque of the gantry reaches a minimum value,
- when the trolley is stopped along the second axis, determining a second remarkable point for the second curve of the model as a maximum negative value of the angle of the second sway when the torque of the trolley reaches a maximum value or as a maximum positive value of the angle of the second sway when the torque of the trolley reaches a minimum value, when the gantry and the trolley are moving at a steady speed, determining a first remarkable point for the third curve of the model as a maximum unsigned value of the angle of the third sway when a load measurement or the torque of the hoist mechanism reaches a minimum value, and determining a second remarkable point for the third curve of the model as a zero value of the angle of the third sway when a load measurement or the torque of the hoist mechanism reaches a maximum value, synchronizing the model with at least of one the first remarkable point for the first curve, first remarkable point for the second curve, second remarkable point for the first curve, second remarkable point for the second curve, first remarkable point for the third curve, second remarkable point for the third curve.

Advantageously, the method can be implemented for a particular architecture of the anti-sway function in an automated system. A particularity is to center the function around a digital swing model, and to base the regulation on this digital swing.

Indeed, the mathematical model can be synchronized using information already available that can be only remarkable points. Indeed, a mathematics model could be resynchronized with only one remarkable point.

In an embodiment, the gantry is able to move substantially horizontally along a first axis and the trolley is able to move substantially horizontally along the second axis.

In an embodiment, the first axis and the second axis are substantially orthogonal.

In an embodiment, the model is synchronized with a remarkable point for a curve by setting the time of the curve to the remarkable point.

In an embodiment, when the gantry and the trolley are moving at a steady speed, at least one the gantry and the trolley is at zero speed.

In an embodiment, when the gantry is stopped along the first axis, a second remarkable point for the first curve of the model is determined as a null angle of the first sway when the torque of the gantry reaches a zero value and when the trolley is stopped along the second axis, a second remarkable point for the second curve of the model is determined as a null angle of the second sway when the torque of the trolley reaches a zero value.

In another implementation, there is provided an apparatus for optimizing a model used in real time by an antisway function for the transport of a load by a hoisting appliance spanning a hoisting area and comprising a gantry and a trolley able to transport the load suspended to a hoist mechanism hosted in the trolley, the gantry being able to move along a first axis and the trolley being able to move along a second axis, wherein, when transported, the load presents a first sway along the first axis and presents a second sway along the second axis, the model representing the theorical sway of the load over time, comprising a first curve representing a first sway along the first axis, a second curve representing a second sway along the second axis, and a third curve representing a third sway being a vector of the first sway and the second sway, the apparatus comprising:

one or more network interfaces to communicate with a telecommunication network;

a processor coupled to the network interfaces and configured to execute one or more processes; and a memory configured to store a process executable by the processor, the process when executed operable to:

when only the gantry is moving and accelerating along the first axis, determine a first remarkable point for the first curve of the model as a maximum first sway when the torque of the gantry reaches a maximum value, when only the trolley is moving and accelerating along the second axis, determine a first remarkable point for the second curve of the model as a maximum second sway when the torque of the trolley reaches a maximum value, when the gantry is stopped along the first axis, determine a second remarkable point for the first curve of the model as a maximum negative value of the angle of the first sway when the torque of the gantry reaches a maximum value or as a maximum positive value of the angle of the first sway when the torque of the gantry reaches a minimum value, when the trolley is stopped along the second axis, determine a second remarkable point for the second curve of the model as a maximum negative value of the angle of the second sway when the torque of the trolley reaches a maximum value or as a maximum positive value of the angle of the second sway when the torque of the trolley reaches a minimum value, when the gantry and the trolley are moving at a steady speed, determine a first remarkable point for the third curve of the model as a maximum unsigned value of the angle of the third sway when a load measurement or the torque of the hoist mechanism reaches a minimum value, and determine a second remarkable point for the third curve of the model as a zero value of the angle of the third sway when a load measurement or the torque of the hoist mechanism reaches a maximum value, synchronize the model with at least of one the first remarkable point for the first curve, first remarkable point for the second curve, second remarkable point for the first curve, second remarkable point for the second curve, first remarkable point for the third curve, second remarkable point for the third curve.

In another implementation there is provided a computer-readable medium having embodied thereon a computer program for executing a method for optimizing a model used in real time by an antisway function for the transport of a load by a hoisting appliance. Said computer program comprises instructions which carry out steps according to the method according to the invention.

BRIEF DESCRIPTION OF THE FIGURES

The detailed description is described with reference to the accompanying FIGURES. In the FIGURES, the left-most digit(s) of a reference number identifies the figure in which the reference number first appears. The same numbers are used throughout the FIGURES to reference like features and components. Some embodiments of system and/or methods in accordance with embodiments of the present subject matter are now described, by way of example only, and with reference to the accompanying FIGURES, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The FIGURES and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
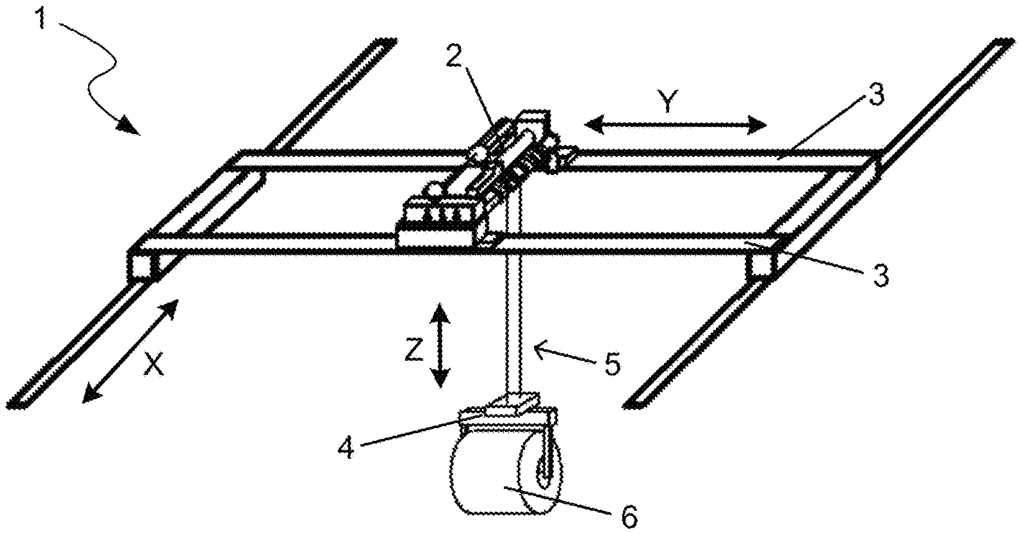
FIG. 1 shows schematically an example of a hoisting appliance.
Figure 2:
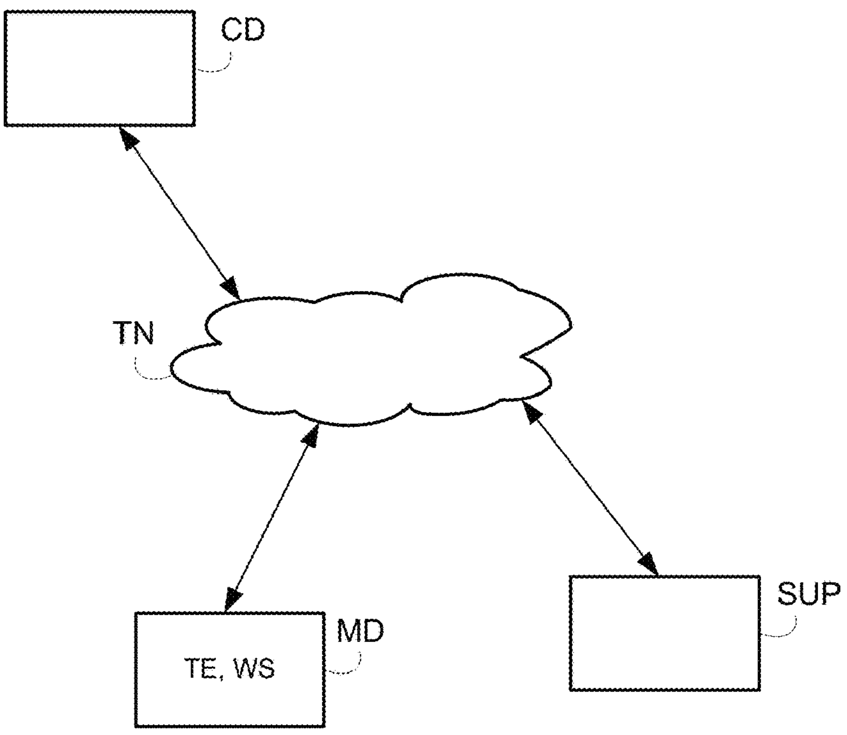
FIG. 2 shows schematically an example of a communication system for optimizing an anti-sway algorithm for the transport of a load by a hoisting appliance.

Referring to FIG. 2, a communication system for optimizing an antisway function for the transport of a load by a hoisting appliance comprises a control device CD, a set of meter devices MD and a supervisory system SUP.

A hoisting area, such as a warehouse, a yard, a hall, or other working area, is provided with a supervisory system SUP that is an IT control system for supervision of the hoisting area. The supervisory system provides information to the control device CD for trajectory execution, authorization i.e. access management, and security in general.

The control device CD is able to communicate with the supervisory system SUP and with the set of meter devices MD through a telecommunication network TN. The telecommunication network may be a wired or wireless network, or a combination of wired and wireless networks. The telecommunication network can be associated with a packet network, for example, an IP ("Internet Protocol") high-speed network such as the Internet or an intranet, or even a company-specific private network. The control device CD may be Programmable Logic Controllers (PLC) and other automation device able to implement industrial processes and able to communicate with the supervisory system for exchanging data such as requests, inputs, control data, etc. . . .

In one embodiment, the set of meter devices MD includes a torque estimator TE and a weighting system WS.

The torque estimator TE is configured to measure the torque of the hoist along axis X and axis Y when moving, and along axis Z when manipulating the load. The torque estimator TE can include a torque meter or can retrieve information from a motor providing movement to the gantry along axis X and from a motor providing movement to the trolley along axis Y. The torque estimator TE can retrieve also information from a motor lifting or lowering the load along axis Z.

The weighting system WS may be linked to the tool and is configured to measure the weight of the load.

The control device CD is configured to create a path to be followed by the crane for transporting a load from one place within the hoisting area to another. Usually, an anti-sway algorithm is used for the damping of sways of a load during the operation of the bridge crane, which provides the increase of a mechanism performance, reduces the risk of accidents and traumatic situations. Methods that are used to achieve this goal may include mathematical model and computer simulation.

Some anti-sway systems in close loop can be based on the use of a load angle sensor. For example, an anti-sway algorithm takes as inputs dynamic parameters of hoisting appliance comprising the current position of the trolley and the current angle of the load with respect to the trolley. However, to be more reactive to damp the sway of the load, an anti-sway algorithm may take into account the mechanical environment of the crane that leads to angle offsets of the trolley.

For an anti-sway system in open loop, the anti-sway algorithm is based on a mathematical model and does not use data coming from sensors, such as an angle sensor. In one embodiment, the anti-sway algorithm uses data coming from meter devices in order to adjust the mathematical model, that can be desynchronized with reality, for example in time or in amplitude.

The control device CD is configured to determine remarkable points that can be used for optimizing an antisway function, by resynchronizing the mathematical model with at least one of the determined remarkable points.

Figure 3A:
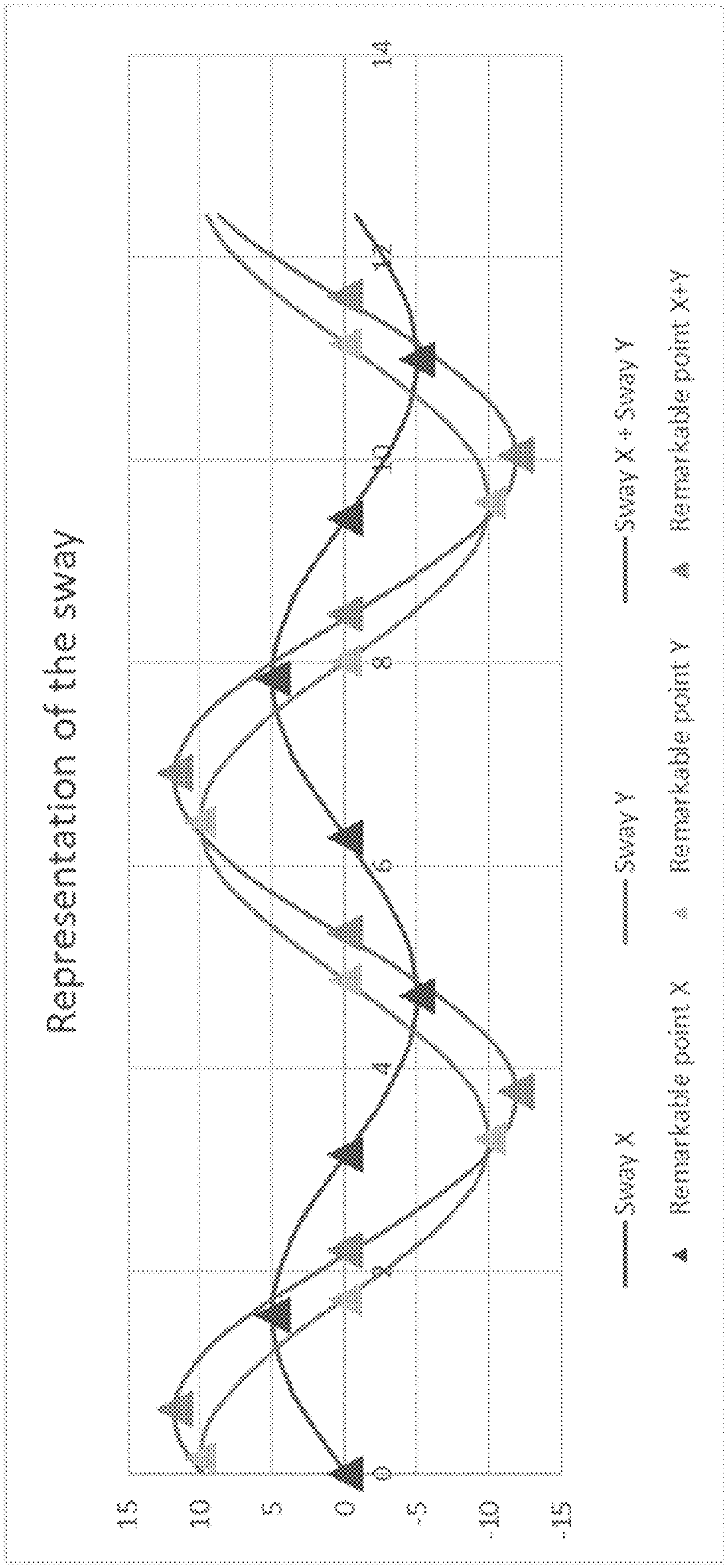
FIG. 3*a* illustrates a representation of a sway on components axis X and Y and of a sway vector (X+Y)

Referring to FIG. 3*a*, it is represented a first sway, called sway X, of the suspended load along axis X via a first curve and a second sway, called sway Y, of the suspended load along axis Y via a second curve, being components of a third sway that is a sway vector (sway X+sway Y) represented via a third sway, according to a mathematical model. ItT is assumed that axis X and axis Y are substantially orthogonal. During the transport of the load, the control device CD is using in real time the mathematical model to follow the theorical sways of the load during time.

When the trolley is travelling, the suspended load presents an angle with respect to axis X or axis Y, corresponding to the sway X or the sway Y. The mathematical model gives the amplitude of the sway with respect to time.

For each curve, there are some remarkable points that correspond to a maximum of the curve, a minimum of the curve or to the value "0".

Figure 3B:
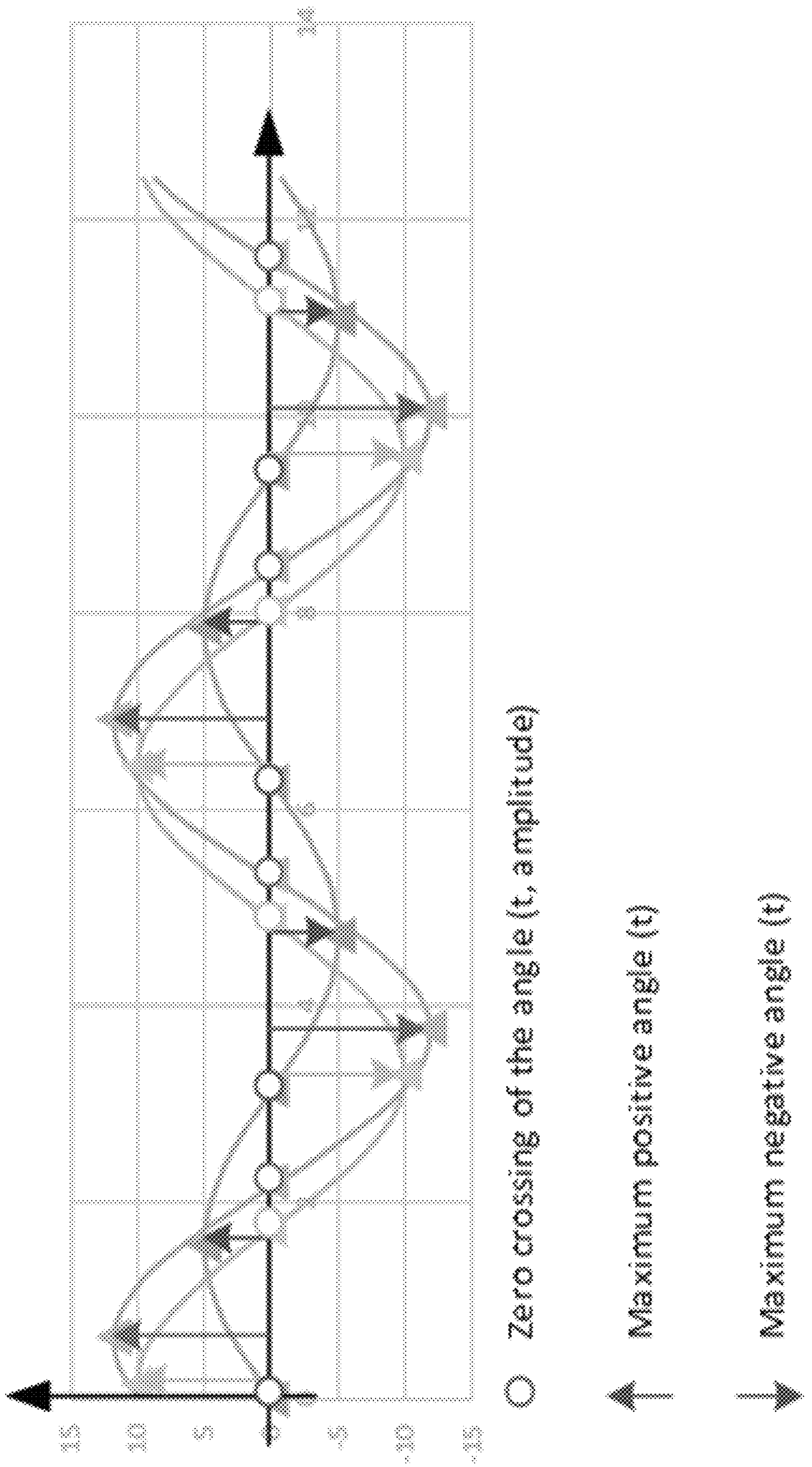
FIG. 3*b* illustrates a representation of remarkable points for sway on components axis X and Y and of a sway vector (X+Y)

Referring to FIG. 3*b*, it is highlighted the representation of remarkable points for the representation of a sway X of the suspended load along axis X and a sway Y of the suspended load along axis Y, being components of a sway vector (sway X+sway Y) according to the same mathematical model.

For each curve, a remarkable point can correspond to a maximum positive angle, a maximum negative angle or a zero crossing of the angle.

In one embodiment, the control device is configured to detect at least some of these remarkable points thanks to physical measurements available on the crane. There are mainly 3 phases that could be used to detect a remarkable point.

In a first phase, the control device can retrieve partial information of the sway X or the sway Y based on the gantry or trolley movement torque signal, when said movement is in acceleration phase. It is possible to detect a maximum sway position during the acceleration for a horizontal movement by analyzing the torque signal.

In a second phase, the control device can retrieve partial information of the sway X or the sway Y based on the gantry or trolley movement torque signal, when said movement is stopped. It is possible to get maximum positive and negative angle by analyzing the torque of a movement at zero speed.

In a third phase, the control device can retrieve partial information of the sway vector (X+Y) based on the weighting system, when horizontal movements (X and Y) are steady, and can retrieve partial information of the sway vector (X+Y) based on hoisting movement torque signal, when horizontal movements (X and Y) are steady. It is possible to get zero angle value and maximum angle (unknown sign) for the sway vector (X+Y) by analyzing the torque of the hoisting at zero speed or load measurement.

Figure 4A:
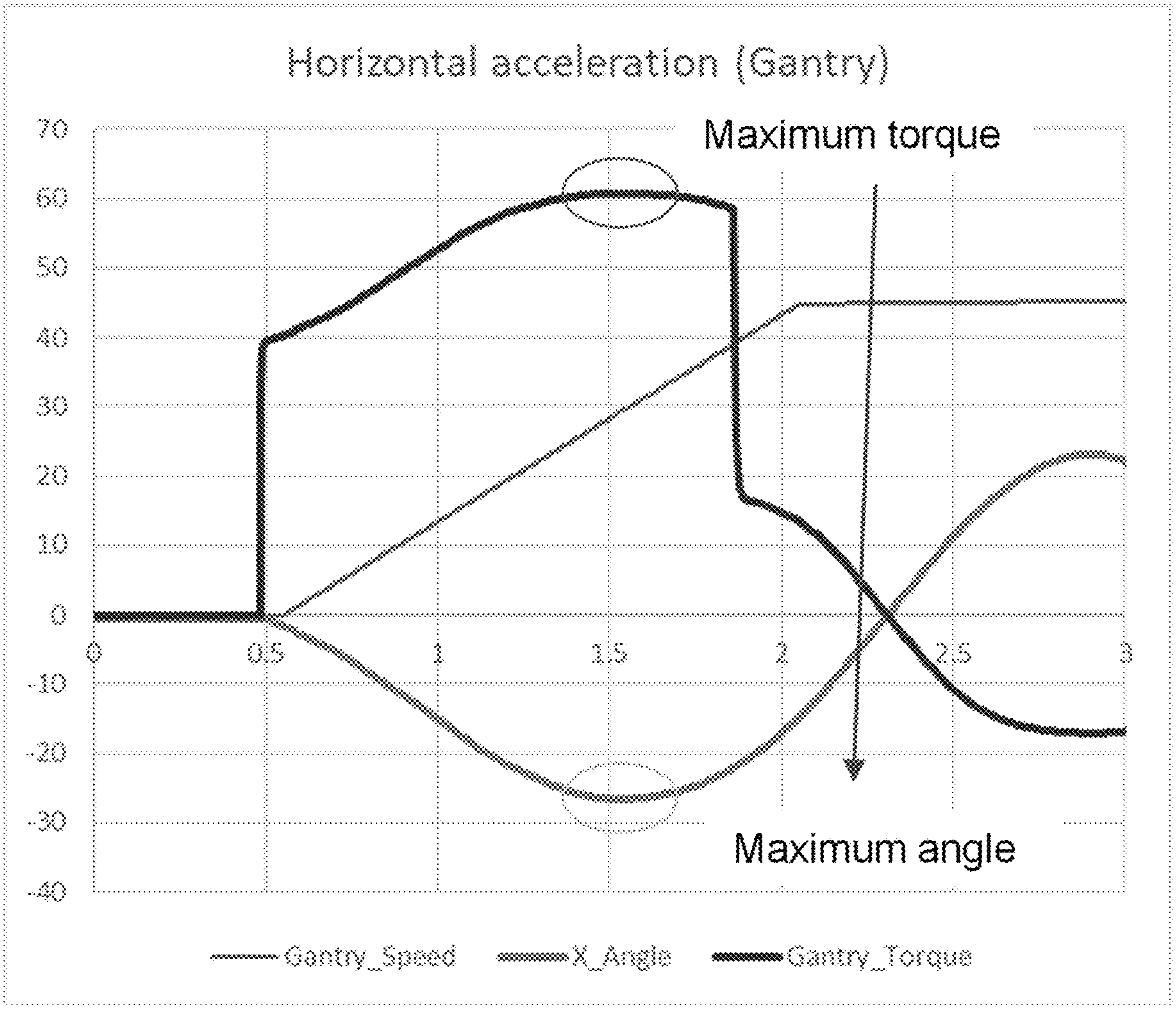
FIG. 4*a* illustrates a representation of remarkable points linked to torque during horizontal acceleration.

Referring to FIG. 4*a*, the hoist is moving and accelerating along one of axis X or axis Y, meaning the gantry is moving along axis X or the trolley is moving along axis Y. In FIG. 4*a*, torque measurement (Gantry_Torque) for the gantry is shown for a corresponding speed (Gantry_Speed) of the gantry with horizontal acceleration. It is observed that, when the torque of the horizontal movement is maximum (value "Maximum torque"), it gives the information that the angle (X_Angle) of the load with respect to axis X is at its maximum value (value "Maximum angle"). In FIG. 4*a* are represented measurements for axis X, it is understood that similar representation can be obtained for measurements for axis Y, based on similar principles. FIG. 4*a* can be assimilated to an observation that indicates when the angle is maximum, i.e. when the torque of the motor is maximum.

Figure 4B:
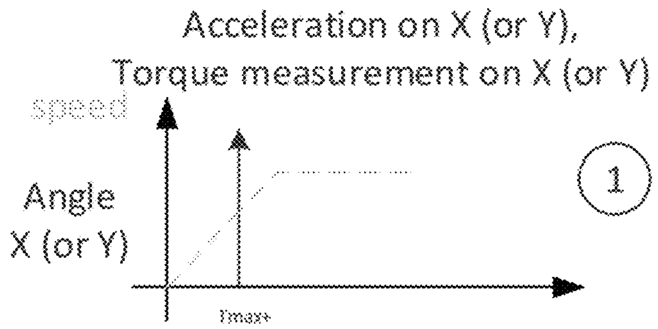
FIG. 4*b* illustrates another representation of remarkable points with respect to speed along axis X or Y.

Referring to FIG. 4*b*, it is illustrated another representation of the speed of the tool, the same as in FIG. 4*a*, along axis X or Y. FIG. 4*b* can be assimilated to a real time case using the results of FIG. 4*a*. When the torque measurement indicates a maximum value, it means the angle is maximum and the time (Tmax+) corresponding to this maximum can be retrieved.

This retrieved time can then be used to synchronize the mathematical model. When transporting the load, if the control device CD detects a first point of the model by measuring a maximum torque value, the control device sets the time of the model to the maximum angle. The time of the model is set for the sway X, respectively for the sway Y, when the measurement is done for the torque along axis X, respectively along axis Y.

Figure 5A:
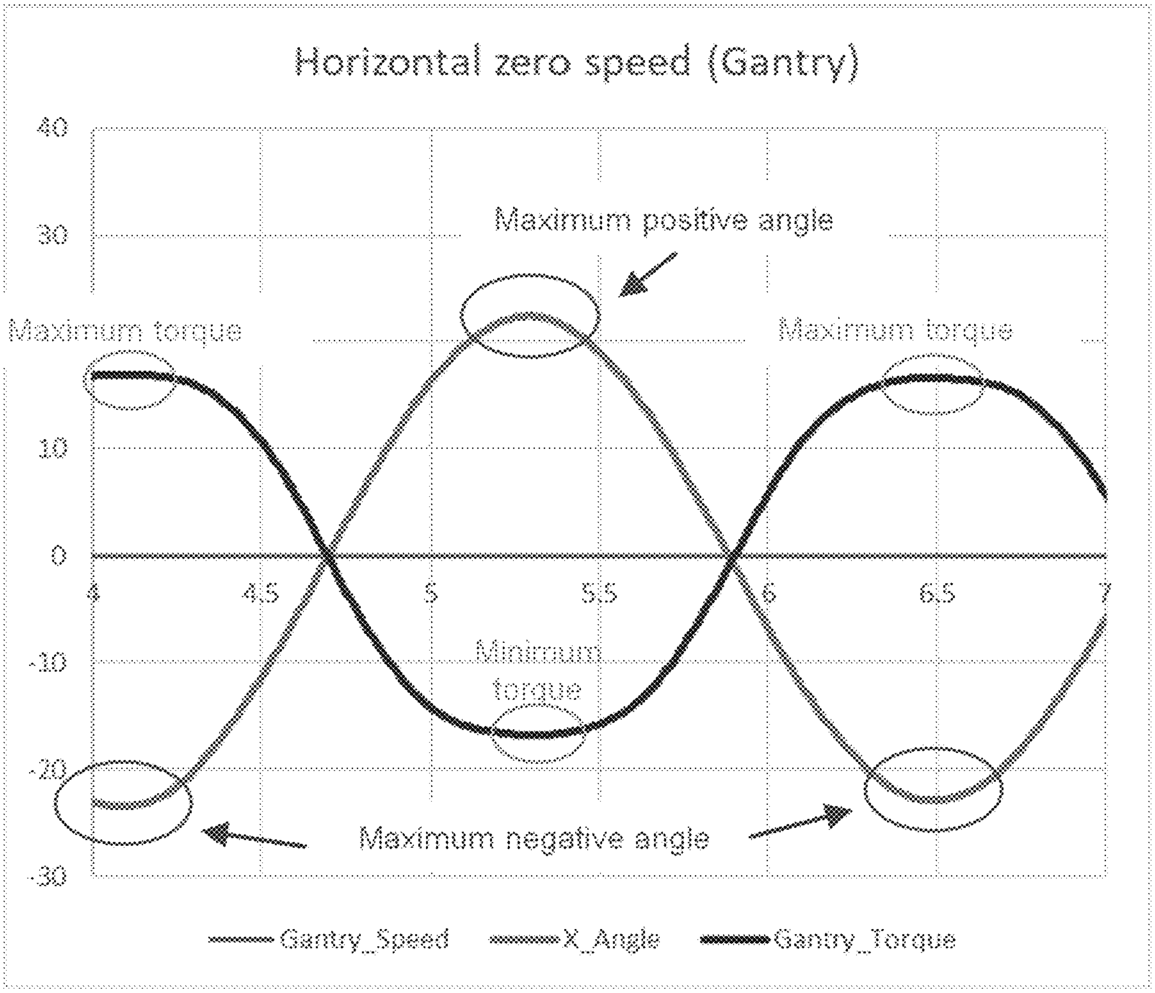
FIG. 5*a* illustrates a representation of remarkable points linked to torque with horizontal zero speed.

Referring to FIG. 5*a*, the hoist was moving and is stopped along one of axis X or axis Y, meaning the gantry is not moving anymore along axis X or the trolley is not moving anymore along axis Y. In FIG. 5*a*, measurement of the torque (Gantry_Torque) for the gantry is shown for a corresponding speed (Gantry_Speed) of the gantry, the speed being equal to zero. It is observed that, when the torque of the gantry is maximum (value "Maximum torque"), it gives the information that the angle (X_Angle) of the with respect to axis X is at its maximum negative value (value "Maximum negative angle"), and similarly when the torque of the gantry is minimum (value "Minimum torque"), it gives the information that the angle (X_Angle) of the with respect to axis X is at its maximum positive value (value "Maximum positive angle"). In FIG. 5*a* are represented measurements for axis X, it is understood that similar representation can be obtained for measurements for axis Y, based on similar principles. FIG. 5*a* can be assimilated to an observation that indicates when the angle is maximum, i.e. when the torque of the motor is minimum, and vice versa as the torque and the load follows opposite amplitudes. It is observed that when the hoist is moving along one direction and then is stopped the torque of the motor for said one direction is maximum when the load presents maximum negative angle, with a sway backwards with respect to said one direction.

Figure 5B:
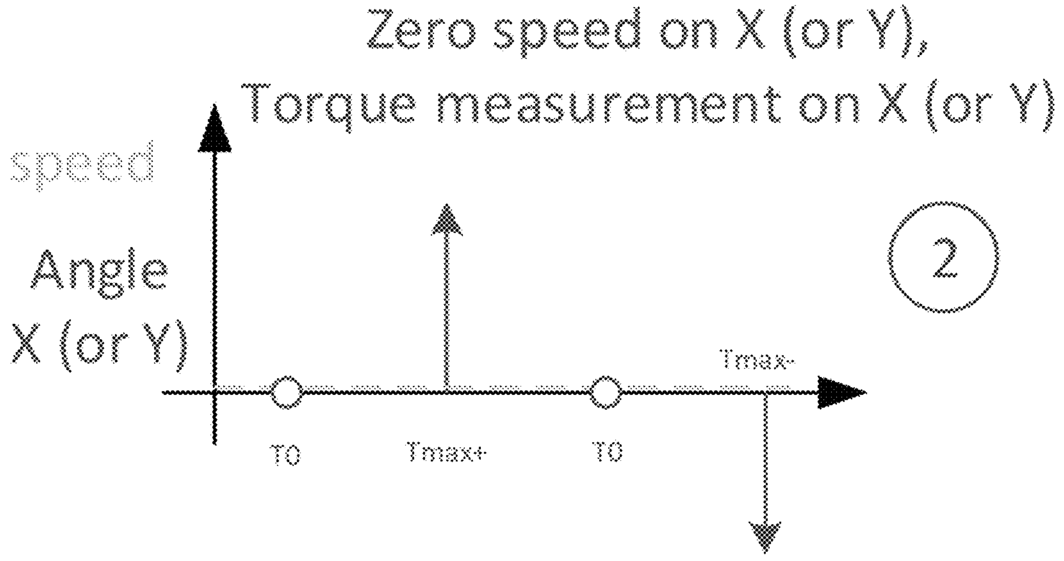
FIG. 5*b* illustrates another representation of remarkable points with respect to speed along axis X or Y.

Referring to FIG. 5*b*, it is illustrated another representation of the speed (equal to zero) of the hoist, the same as in FIG. 5*a*, along axis X or Y. FIG. 5*b* can be assimilated to a real time case using the results of FIG. 5*a*. When the torque measurement indicates a maximum value (arrow upwards), it means the negative angle is maximum and the time (Tmax+) corresponding to this maximum negative angle can be retrieved. In a similar way, when the torque measurement indicates a minimum value (arrow downwards), it means the positive angle is maximum and the time (Tmax−) corresponding to this maximum positive angle can be retrieved. Also when the curves cross, i.e. when the torque has a zero value (circle at zero), it means the angle is null and the time (T0) corresponding to this zero value can be retrieved.

This retrieved time can then be used to synchronize the mathematical model. When transporting the load, if the control device CD detects a second point of the model by measuring a maximum torque value, respectively a minimum torque value, the control device sets the time of the model to the maximum negative angle, respectively the maximum positive angle. The time of the model is set for the sway X, respectively for the sway Y, when the measurement is done for the torque along axis X, respectively along axis Y.

Figure 6A:
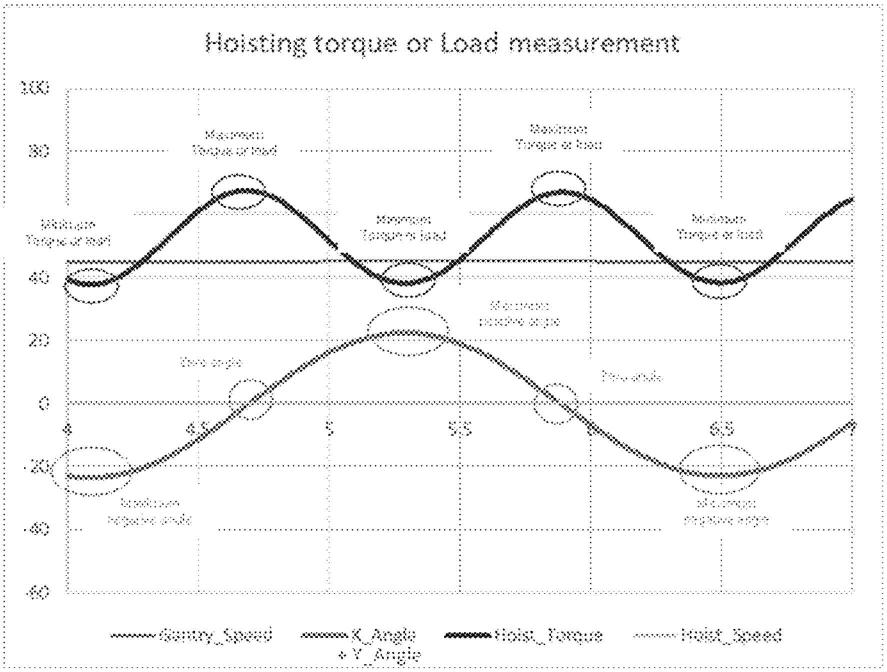
FIG. 6*a* illustrates a representation of remarkable points linked to torque with horizontal steady speed.

Referring to FIG. 6*a*, the hoist is moving at a steady speed along both axis X and axis Y, meaning the gantry is moving along axis X at a steady speed and the trolley is moving along axis Y a steady speed, wherein the speed can be equal to zero for one of the axis. In FIG. 6*a*, load measurement or measurement of the torque (Hoist_Torque) for the hoist is shown for a corresponding speed (Gantry_Speed) of the gantry and a corresponding speed (Hoist_Speed) of the hoist that is equal to zero. The hoist is not in action, i.e. not lifting or lowering the load. It is observed that, when the torque of the hoist is minimum (value "Minimum Torque or load"), it gives the information that the angle (X_Angle+Y_Angle) of the load with respect to axis X and axis Y is at its maximum unsigned value (value "Maximum positive angle" or "Maximum negative angle"). It is also observed that, when the torque of the hoist is maximum (value "Maximum Torque or load"), it gives the information that the angle (X_Angle+Y_Angle) of the load with respect to axis X and axis Y is at a zero value (value "Zero angle").

Figure 6B:
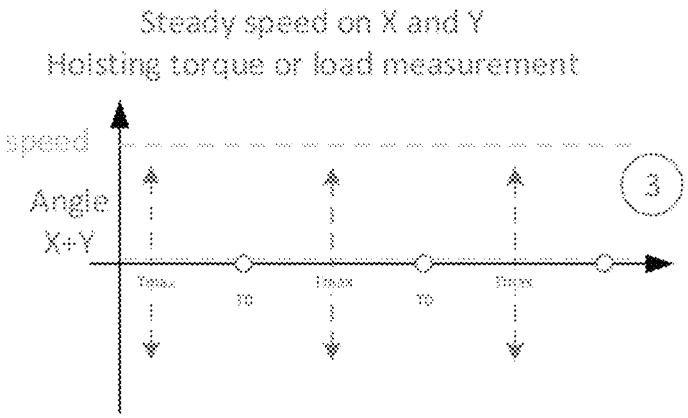
FIG. 6*b* illustrates another representation of remarkable points with respect to speed along axis X or Y.

Referring to FIG. 6*b*, it is illustrated another representation of the speed (steady) of the hoist, the same as in FIG.

6*a*, along axis X or Y. FIG. 6*b* can be assimilated to a real time case using the results of FIG. 6*a*. When the hoist torque measurement indicates a minimum value (arrows upwards and downwards), it means the angle of the sway X+Y is maximum and unsigned and the time (Tmax) corresponding to this maximum angle can be retrieved. Also, when the hoist torque measurement indicates a maximum value (circle at zero), it means the angle is null and the time (TO) corresponding to this zero value can be retrieved.

This retrieved time can then be used to synchronize the mathematical model. When transporting the load, if the control device CD detects a third point of the model by measuring a maximum torque value, respectively a minimum torque value, the control device sets the time of the model for the sway X+Y to the zero angle, respectively to one of the maximum positive angle and the maximum negative angle.

Figure 7:
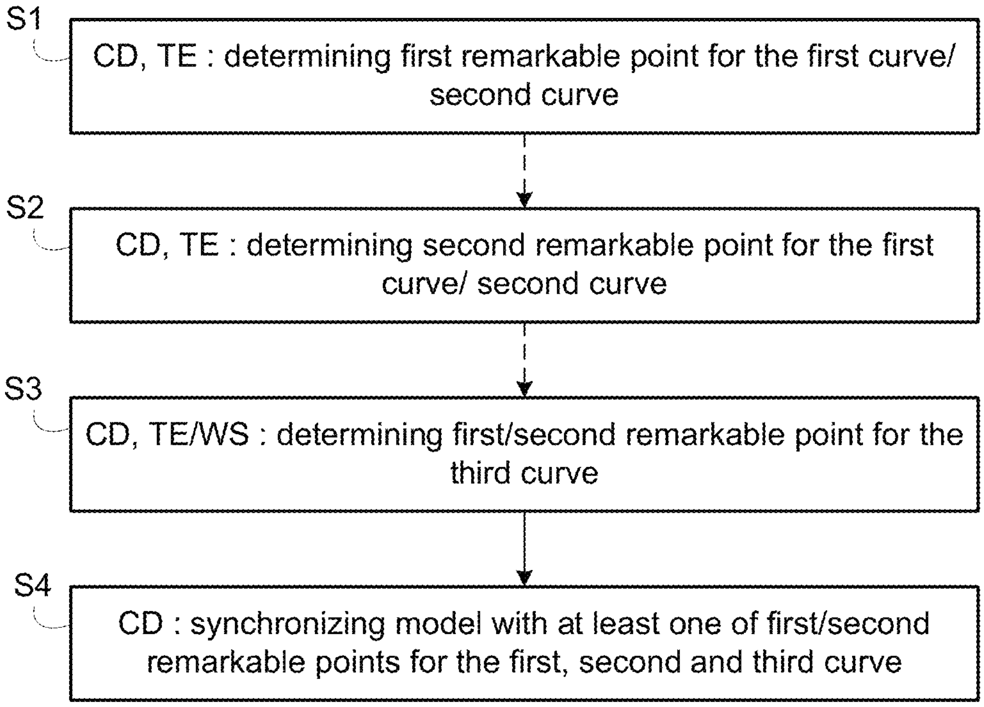
FIG. 7 illustrates a flow chart illustrating a method for optimizing a model used by an antisway function for the transport of a load by a hoisting appliance according to one embodiment.

With reference to FIG. 7, a method for optimizing a model used by an antisway function for the transport of a load by a hoisting appliance according to one embodiment of the invention comprises steps S1 to S4.

Initially, the control device CD stores a mathematical model and implements an anti-sway algorithm that uses in real time the mathematical model to follow the theorical sways of the load during transport. The control device CD initiates the transport of the load and is configured to determine remarkable points of the mathematical model according to at least one of steps S1 to S3, the order of steps S1 to S3 being interchangeable.

In step S1, the hoist is moving and accelerating along one of axis X and axis Y and is not moving along the other one of axis X and axis Y. The hoist can move according to two cases: the gantry is moving and accelerating along the axis X and is not moving along the axis Y, or the trolley is moving and accelerating along the axis Y and is not moving along the axis X. The control device CD, by means of the torque estimator TE, determines when the torque of the horizontal movement reaches a maximum value, which gives the information that the angle of the load with respect to said one of axis X or axis Y is at its maximum value. Therefore the control device CD can detect a maximum sway position during the acceleration of an horizontal movement by analyzing the torque of the corresponding movement and determining the maximum value of the torque.

Thus the control device CD determines a first remarkable point for the model as the detected maximum sway position, for the first curve or the second curve depending on the axis X or axis Y.

In step S2, the hoist is stopped along one of axis X and axis Y. The hoist was moving and is stopped according to two cases: the gantry is stopped along the axis X whereas the trolley continues to move along the axis Y, or the trolley is stopped along the axis Y whereas the gantry continues to move along the axis X.

When the gantry is stopped along the axis X, the control device CD, by means of the accelerometer ACC, determines when the torque of the gantry reaches a maximum value, which gives the information that the angle of the first sway along the axis X at its maximum negative value. The control device CD determines when the torque of the gantry reaches a minimum value, which gives the information that the angle of the first sway along the first axis X at its maximum positive value.

Similarly, when the trolley is stopped along the axis Y, the control device CD determines when the torque of the trolley reaches a maximum value, which gives the information that the angle of the second sway along the axis Y at its maximum negative value. The control device CD determines when the torque of the trolley reaches a minimum value, which gives the information that the angle of the second sway along the axis Y at its maximum positive value.

Therefore the control device CD can detect a maximum negative angle or a maximum positive angle of the sway by analyzing the torque of the corresponding movement at zero speed.

Thus the control device CD determines a second remarkable point for the model as the maximum negative angle or a maximum positive angle of the sway, for the first curve or the second curve depending on the axis X or axis Y.

In one embodiment, the control device CD determines also when the torque of the gantry or of the trolley reaches a zero value, which gives the information that the angle of the first sway or of the second sway has a zero (is null). Thus the control device CD determines a second remarkable point for the model as a null angle or, for the first curve or the second curve depending on the axis X or axis Y.

In step S3, the hoist is moving at a steady speed along both axis X and axis Y, meaning the gantry is moving along axis X at a steady speed and the trolley is moving along axis Y a steady speed, wherein the speed can be equal to zero for one of the axis.

The control device CD, by means of the torque estimator TE, determines when the torque of the hoist is minimum, which gives the information that the angle of the third sway is at its maximum unsigned value (maximum positive value or maximum negative value). The control device CD determines also when the torque of the hoist is maximum, which gives the information that the angle of the third sway is at a zero value. Alternatively, the load measurement is used instead of the torque of the hoist, by means of the weighting system WS.

Therefore the control device CD can detect a maximum unsigned angle or a zero angle for the third sway by analyzing the torque of the hoist or the load measurement.

Thus the control device CD determines a first remarkable point for the third curve of the model as the detected maximum unsigned angle or a second remarkable point for the third curve of the model as the detected zero angle.

In step S4, the control device CD synchronizes the model with at least of one the first remarkable point for the first curve, first remarkable point for the second curve, second remarkable point for the first curve, second remarkable point for the second curve, first remarkable point for the third curve, second remarkable point for the third curve.

The control device CD synchronizes the model with a remarkable point for a curve by setting the time of the curve to the remarkable point. The synchronization can be performed as soon as said remarkable point is detected.

In one embodiment with the first phase, the control device CD synchronizes the model with the determined first remarkable point for the first or second curve as soon as it is detected. To that end, the control device CD compares the retrieved real time corresponding to this maximum value of the torque (thus maximum sway position) with the theorical time of the model corresponding to this maximum sway position. If the retrieved real time and the theorical time are different, the control device CD synchronizes the model with the determined first remarkable point by setting the model with the maximum sway position at the retrieved real time.

In one embodiment with the second phase, the control device CD synchronizes the model with the determined second remarkable point for the first or second curve as soon as it is detected. To that end, the control device CD compares the retrieved real time corresponding to this maximum value or minimum of the torque (thus maximum negative angle or maximum positive angle respectively) with the theorical time of the model corresponding to this maximum negative angle or maximum positive angle respectively. If the retrieved real time and the theorical time are different, the control device CD synchronizes the model with the determined second remarkable point by setting the model with the maximum negative angle or maximum positive angle at the retrieved real time.

Also in the embodiment with the second phase, the control device CD can synchronize the model with the determined second remarkable for the first or second curve as a null angle point as soon as it is detected. To that end, the control device CD compares the retrieved real time corresponding to this zero value of the torque with the theorical time of the model corresponding to this null angle. If the retrieved real time and the theorical time are different, the control device CD synchronizes the model with the determined second remarkable point by setting the model with the null angle at the retrieved real time.

In one embodiment with the third phase, the control device CD synchronizes the model with the determined first remarkable point or second remarkable point for the third curve of the model as soon as it is detected. To that end, the control device CD compares the retrieved real time corresponding to this minimum value of the torque (thus maximum vector sway position) or maximum value with the theorical time of the model corresponding to this maximum vector sway position. If the retrieved real time and the theorical time are different, the control device CD synchronizes the model with the determined first remarkable point by setting the model with the maximum sway position at the retrieved real time or synchronizes the model with the determined second remarkable point by setting the model with the zero angle for the sway vector at the retrieved real time.

Figure 8A:
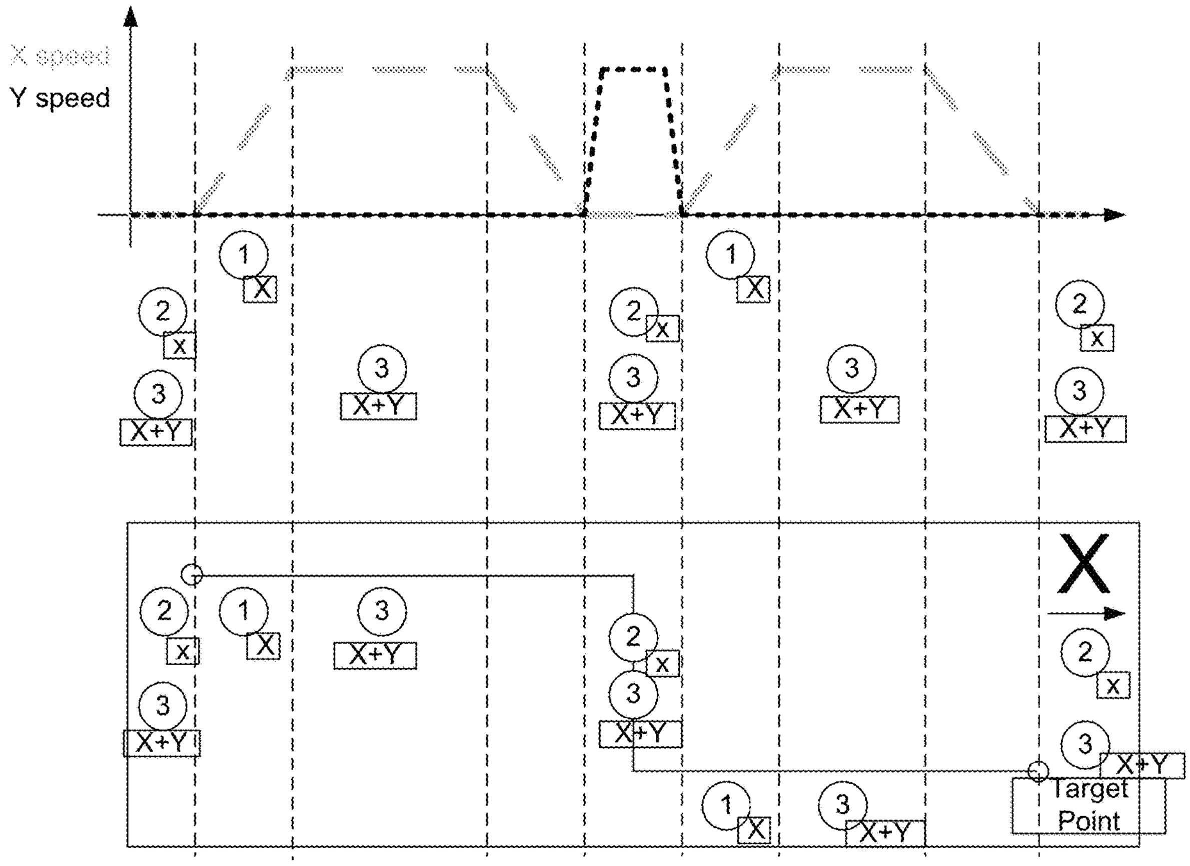
FIG. 8*a* illustrates an example of measurements and resynchronization for X angle.

With reference to FIG. 8*a* there is provided an example of measurements and resynchronization for X angle, with respect to the first curve and the third curve of the model. The load is transported from a first point to a target point via movements in order on axis X, axis Y and axis X. From start, the movement is composed by acceleration, steady speed and deceleration on axis X, then acceleration, steady speed and deceleration on axis Y, and finally again acceleration, steady speed and deceleration on axis X.

Before start, the trolley and the gantry are not moving but the load can have been hoisted and is ready to be transported. It can be determined a second remarkable point for the first curve as gantry is stopped, and first and second remarkable points for the third curve as both gantry and trolley are at steady speed (here stopped).

After start, during acceleration on axis X, it can be determined a first remarkable point for the first curve as gantry is accelerating.

During transport on axis X, it can be determined first and second remarkable point for the third curve as both gantry is at steady speed and trolley is at zero speed.

During deceleration on axis X till movement on axis Y, no remarkable point is determined.

During transport on axis Y, it can be determined a second remarkable point for the first curve as gantry is at zero speed, and first and second remarkable point for the third curve as gantry is at zero speed and trolley is at steady speed.

Then occurs again a transport on axis X. During acceleration on axis X, it can be determined a first remarkable point for the first curve as gantry is accelerating. During transport on axis X, it can be determined first and second remarkable point for the third curve as both gantry is at steady speed and trolley is at zero speed.

After deceleration on axis X till zero speed (as before start), it can be determined a second remarkable point for the first curve as gantry is stopped, and first and second remarkable points for the third curve as both gantry and trolley are at steady speed (here stopped).

The model can be resynchronized for the first curve for the sway X just after determination of a first or second remarkable point during transport. The model can be resynchronized also for the third curve for the sway X+Y just after determination of a first or second remarkable point during transport. The time for resynchronization depends on the determined remarkable point and can be decided by the operator.

Figure 8B:
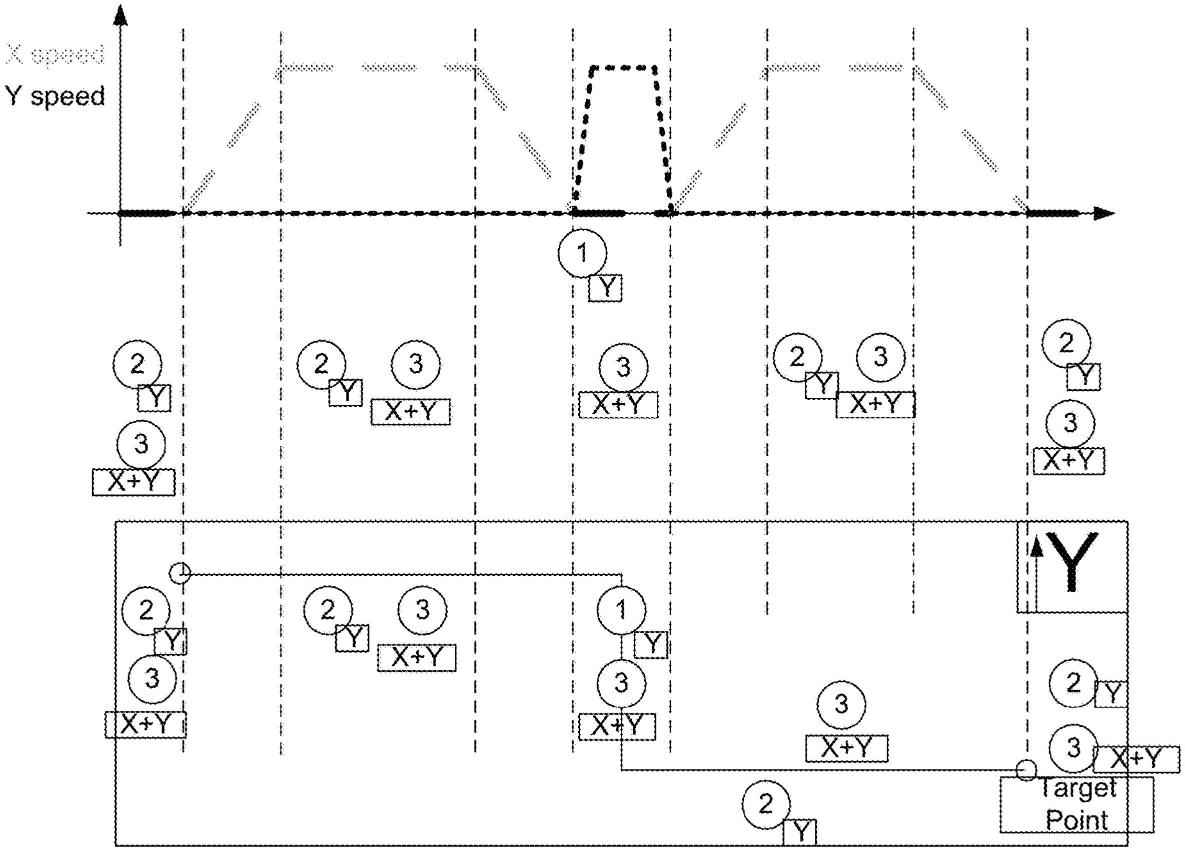
FIG. 8*b* illustrates an example of measurements and resynchronization for Y angle.

With reference to FIG. 8*b* there is provided an example of measurements and resynchronization for Y angle, with respect to the second curve and the third curve of the model, in a similar way as in FIG. 8*a*. The load is transported in the same manner from a first point to a target point via movements in order on axis X, axis Y and axis X. From start, the movement is composed by acceleration, steady speed and deceleration on axis X, then acceleration, steady speed and deceleration on axis Y, and finally again acceleration, steady speed and deceleration on axis X.

Before start, the trolley and the gantry are not moving but the load can have been hoisted and is ready to be transported. It can be determined a second remarkable point for the second curve as trolley is stopped, and first and second remarkable points for the third curve as both gantry and trolley are at steady speed (here stopped).

After start, during transport on axis X, it can be determined a second remarkable point for the second curve as trolley is at zero speed, and first and second remarkable point for the third curve as both gantry is at steady speed and trolley is at zero speed.

During deceleration on axis X till movement on axis Y, no remarkable point is determined.

During transport on axis Y, and during acceleration on axis Y, it can be determined a first remarkable point for the second curve as trolley is accelerating.

During transport on axis Y, after acceleration and before deceleration, first and second remarkable point for the third curve as gantry is at zero speed and trolley is at steady speed.

Then occurs again a transport on axis X. During transport on axis X, it can be determined a second remarkable point for the second curve as trolley is at zero speed, and it can be determined first and second remarkable point for the third curve as gantry is at steady speed and trolley is at zero speed.

After deceleration on axis X till zero speed (as before start), it can be determined a second remarkable point for the second curve as gantry is stopped, and first and second remarkable points for the third curve as both gantry and trolley are at steady speed (here stopped).

The model can be resynchronized for the second curve for the sway Y just after determination of a first or second remarkable point during transport. The model can be resynchronized also for the third curve for the sway X+Y just after determination of a first or second remarkable point during transport. The time for resynchronization depends on the determined remarkable point and can be decided by the operator.

The principles of FIGS. 8*a* and 8*b* show that the model can be resynchronized many times during the transport of the load, taking into account the different behavior of the hoisting system according to the segments (axis X, axis Y) of the transport path.

An embodiment comprises a control device CD under the form of an apparatus comprising one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for optimizing a model used in real time by an antisway function for the transport of a load by a hoisting appliance spanning a hoisting area and comprising a gantry and a trolley able to transport the load suspended to a hoist mechanism hosted in the trolley, the gantry being able to move along a first axis and the trolley being able to move along a second axis, wherein, when transported, the load presents a first sway along the first axis and presents a second sway along the second axis, the model representing the theorical sway of the load over time, comprising a first curve representing a first sway along the first axis, a second curve representing a second sway along the second axis, and a third curve representing a third sway being a vector of the first sway and the second sway, the method comprising in a control device:

when only the gantry is moving and accelerating along the first axis, determining a first remarkable point for the first curve of the model as a maximum first sway when the torque of the gantry reaches a maximum value, when only the trolley is moving and accelerating along the second axis, determining a first remarkable point for the second curve of the model as a maximum second sway when the torque of the trolley reaches a maximum value, when the gantry is stopped along the first axis, determining a second remarkable point for the first curve of the model as a maximum negative value of the angle of the first sway when the torque of the gantry reaches a maximum value or as a maximum positive value of the angle of the first sway when the torque of the gantry reaches a minimum value, when the trolley is stopped along the second axis, determining a second remarkable point for the second curve of the model as a maximum negative value of the angle of the second sway when the torque of the trolley reaches a maximum value or as a maximum positive value of the angle of the second sway when the torque of the trolley reaches a minimum value, when the gantry and the trolley are moving at a steady speed, determining a first remarkable point for the third curve of the model as a maximum unsigned value of the angle of the third sway when a load measurement or the torque of the hoist mechanism reaches a minimum value, and determining a second remarkable point for the third curve of the model as a zero value of the angle of the third sway when a load measurement or the torque of the hoist mechanism reaches a maximum value, synchronizing the model with at least of one the first remarkable point for the first curve, first remarkable point for the second curve, second remarkable point for the first curve, second remarkable point for the second curve, first remarkable point for the third curve, second remarkable point for the third curve.

2. The method according to claim 1, wherein the gantry is able to move substantially horizontally along a first axis and the trolley is able to move substantially horizontally along the second axis.

3. The method according to claim 1, wherein the first axis and the second axis are substantially orthogonal.

4. The method according to claim 1, wherein the model is synchronized with a remarkable point for a curve by setting the time of the curve to the remarkable point.

5. The method according to claim 1, wherein when the gantry and the trolley are moving at a steady speed, at least one the gantry and the trolley is at zero speed.

6. The method according to claim 1, wherein when the gantry is stopped along the first axis, a second remarkable point for the first curve of the model is determined as a null angle of the first sway when the torque of the gantry reaches a zero value and when the trolley is stopped along the second axis, a second remarkable point for the second curve of the model is determined as a null angle of the second sway when the torque of the trolley reaches a zero value.

7. An apparatus for optimizing a model used in real time by an antisway function for the transport of a load by a hoisting appliance spanning a hoisting area and comprising a gantry and a trolley able to transport the load suspended to a hoist mechanism hosted in the trolley, the gantry being able to move along a first axis and the trolley being able to move along a second axis, wherein, when transported, the load presents a first sway along the first axis and presents a second sway along the second axis, the model representing the theorical sway of the load over time, comprising a first curve representing a first sway along the first axis, a second curve representing a second sway along the second axis, and a third curve representing a third sway being a vector of the first sway and the second sway, the apparatus comprising:

one or more network interfaces to communicate with a telecommunication network;

a processor coupled to the network interfaces and configured to execute one or more processes; and a memory configured to store a process executable by the processor, the process when executed operable to:

when only the gantry is moving and accelerating along the first axis, determine a first remarkable point for the first curve of the model as a maximum first sway when the torque of the gantry reaches a maximum value, when only the trolley is moving and accelerating along the second axis, determine a first remarkable point for the second curve of the model as a maximum second sway when the torque of the trolley reaches a maximum value, when the gantry is stopped along the first axis, determine a second remarkable point for the first curve of the model as a maximum negative value of the angle of the first sway when the torque of the gantry reaches a maximum value or as a maximum positive value of the angle of the first sway when the torque of the gantry reaches a minimum value, when the trolley is stopped along the second axis, determine a second remarkable point for the second curve of the model as a maximum negative value of the angle of the second sway when the torque of the trolley reaches a maximum value or as a maximum positive value of the angle of the second sway when the torque of the trolley reaches a minimum value, when the gantry and the trolley are moving at a steady speed, determine a first remarkable point for the third curve of the model as a maximum unsigned value of the angle of the third sway when a load measurement or the torque of the hoist mechanism reaches a minimum value, and determine a second remarkable point for the third curve of the model as a zero value of the angle of the third sway when a load measurement or the torque of the hoist mechanism reaches a maximum value, synchronize the model with at least of one the first remarkable point for the first curve, first remarkable point for the second curve, second remarkable point for the first curve, second remarkable point for the second curve, first remarkable point for the third curve, second remarkable point for the third curve.

8. A non-transitory computer-readable medium having embodied thereon a computer program, which when executed by a processor, causes an apparatus to perform the method for optimizing a model used in real time by an antisway function for the transport of a load by a hoisting appliance according to claim 1.

* * * * *